UNITED STATES PATENT OFFICE.

CHRISTIAN L. SCHURR AND WILLIAM G. REHBEIN, OF BALTIMORE, MARYLAND.

IMPROVEMENT IN WELDING COPPER.

Specification forming part of Letters Patent No. 121,009, dated November 14, 1871.

*To all whom it may concern:*

Be it known that we, CHRISTIAN L. SCHURR and WILLIAM G. REHBEIN, of Baltimore, in the county of Baltimore and State of Maryland, have invented certain Improvements in Process of Welding Copper; and we do hereby declare that the following is a full, clear, and exact description of the same.

This invention relates to a process whereby copper may be welded so as to produce as perfect a union between the surfaces in contact as can be produced in iron—a thing which heretofore has never been done, it having always been found impossible to unite two pieces of copper in any other way than by brazing them, which is an inferior method to welding in respect to the durability of the joint. It has, therefore, long been a desideratum to find some way of welding copper. This object we accomplish, in the case of a copper chain, for instance, by taking ordinary borax and heating it till all its moisture is expelled, and then pulverizing the dry residuum. Having formed a lap-joint between the two ends of the piece of copper designed for a link, the pulverized borax is applied between the surfaces, which are then hammered together cold, after which the joint is heated and dipped first in fine salt and then in human feces for the purpose of excluding air, and finally welded, which the foregoing process enables to be perfectly accomplished.

Having thus described our invention, what we claim as new, and desire to secure by Letters Patent, is—

1. As an article of manufacture, a welded copper chain.
2. The process of welding copper herein described.

To the above specification of our invention we have signed our names this 5th day of October, A. D. 1871.

CHRISTIAN L. SCHURR.
WILLIAM G. REHBEIN.

Witnesses:
 SOLON C. KEMON,
 THOS. D. D. OURAND. (60)